(12) United States Patent
Godin et al.

(10) Patent No.: US 8,607,903 B2
(45) Date of Patent: Dec. 17, 2013

(54) TRACKED VEHICLE

(75) Inventors: Marc-André Godin, Montreal (CA); François Paquet, Granby (CA)

(73) Assignee: Rolic Invest Sarl, Luxembourg (LU)

( * ) Notice: Subject to any disclaimer, the term of this patent is extended or adjusted under 35 U.S.C. 154(b) by 0 days.

(21) Appl. No.: 13/133,892

(22) PCT Filed: Dec. 9, 2009

(86) PCT No.: PCT/CA2009/001801
§ 371 (c)(1),
(2), (4) Date: Oct. 28, 2011

(87) PCT Pub. No.: WO2010/066045
PCT Pub. Date: Jun. 17, 2010

(65) Prior Publication Data
US 2012/0037434 A1    Feb. 16, 2012

Related U.S. Application Data

(60) Provisional application No. 61/121,075, filed on Dec. 9, 2008.

(51) Int. Cl.
*B62D 55/00*    (2006.01)

(52) U.S. Cl.
USPC ......... 180/9.1; 180/9.23; 180/9.34; 180/9.36; 180/9.5; 180/9.62; 305/120; 305/124; 305/133

(58) Field of Classification Search
USPC ............... 180/9.1, 9.21, 9.48, 9.5, 9.52, 9.54, 180/9.56, 9.58, 9.6, 9.62, 9.23, 9.34, 9.36, 180/9.64; 305/120, 124, 125, 131, 132, 305/134, 135, 142, 133
See application file for complete search history.

(56) References Cited

U.S. PATENT DOCUMENTS 3,216,520 A    11/1965    Blonsky
3,826,388 A    7/1974    Oldenburg et al.
(Continued)

FOREIGN PATENT DOCUMENTS

| CA | 2124501 | 12/1997 |
| FR | 769462 | 6/1934 |
| FR | 2708556 | 2/1995 |

OTHER PUBLICATIONS

International Search Report for PCT/CA2009/001801, Dated Feb. 17, 2010, 3 pages.

(Continued)

*Primary Examiner* — Kevin Hurley
*Assistant Examiner* — Marc A Scharich
(74) *Attorney, Agent, or Firm* — Woodcock Washburn LLP

(57) ABSTRACT

A tracked vehicle (e.g., a tracked carrier vehicle) comprising a plurality of track assemblies for traction of the tracked vehicle. Each of the track assemblies supports a portion of a weight of the tracked vehicle when the tracked vehicle is in use. Each track assembly comprises: a first wheel and a second wheel spaced apart from one another along a longitudinal direction of the tracked vehicle; a number of support wheels arranged in an in-line configuration between the first wheel and the second wheel; and an endless track disposed around the first wheel, the second wheel, and the support wheels. The support wheels may comprise at least five (5) support wheels mounted such that, when the tracked vehicle is in use, the portion of the weight of the tracked vehicle supported by the track assembly is never applied to only one of the support wheels.

27 Claims, 6 Drawing Sheets

(56) References Cited

U.S. PATENT DOCUMENTS

| | | | |
|---|---|---|---|
| 4,458,954 A * | 7/1984 | Haas | 305/144 |
| 5,452,949 A | 9/1995 | Kelderman | |
| 5,494,125 A * | 2/1996 | Gustin et al. | 180/9.1 |
| 5,842,757 A | 12/1998 | Kelderman | |
| 5,913,374 A * | 6/1999 | Becker et al. | 180/9.1 |
| 6,247,547 B1 * | 6/2001 | Lemke et al. | 180/9.5 |
| 6,523,905 B2 * | 2/2003 | Tamura et al. | 298/22 R |
| 7,025,429 B2 * | 4/2006 | Yoshida et al. | 305/132 |
| 2002/0030397 A1 | 3/2002 | Tamura et al. | |

OTHER PUBLICATIONS

Written Opinion of the International Searching Authority for PCT/CA2009/001801, Dated Feb. 17, 2010, 3 pages.

* cited by examiner

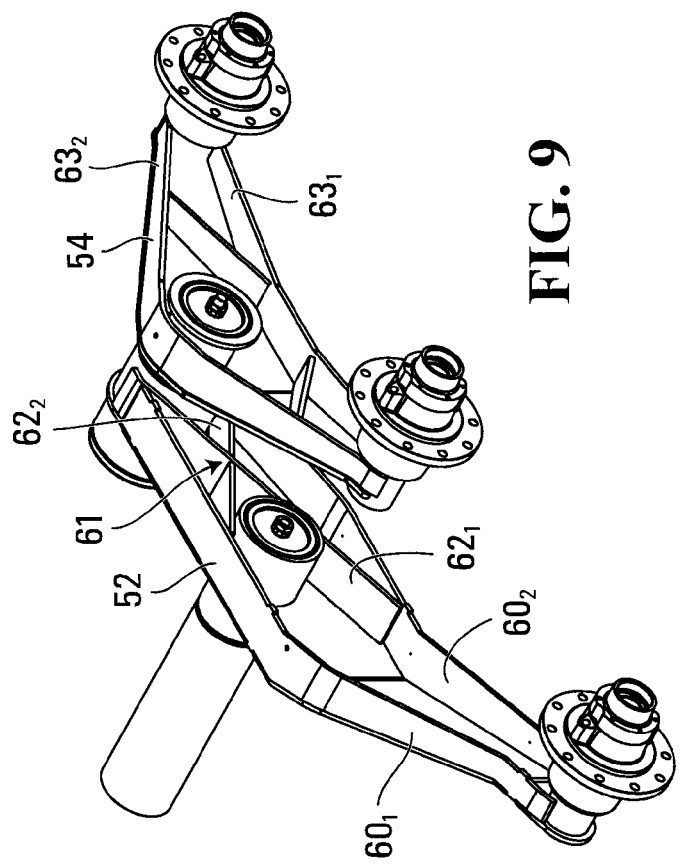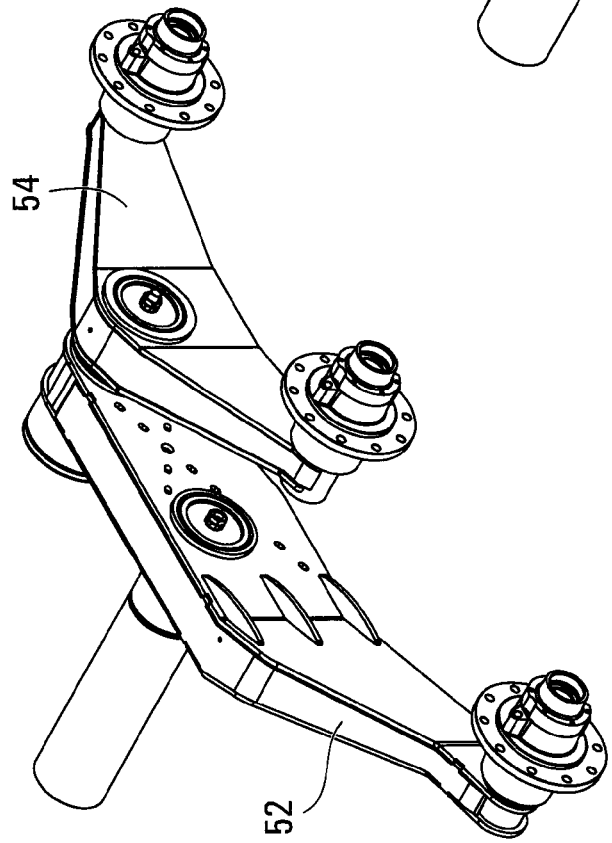

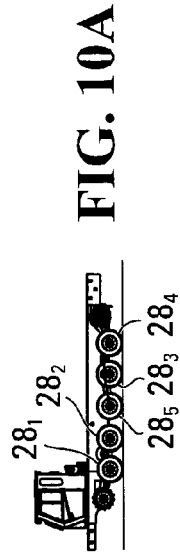
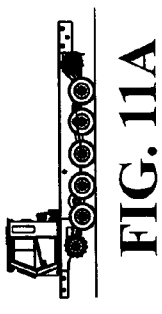 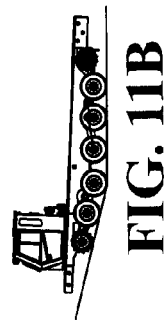 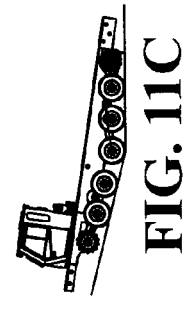 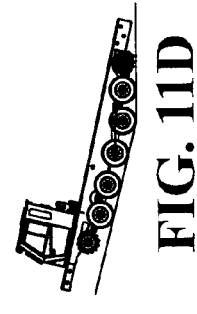
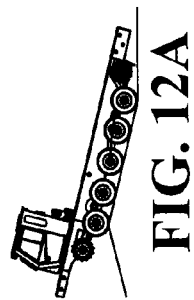 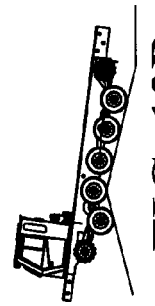 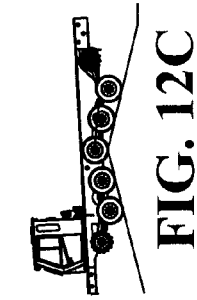 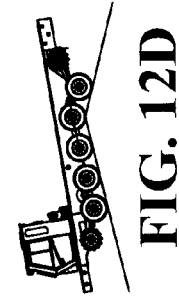

TRACKED VEHICLE

CROSS-REFERENCE TO RELATED APPLICATIONS

This application is the National Stage of International Application No. PCT/CA2009/001801 filed Dec. 9, 2009, which claims the benefit of U.S. Provisional Patent Application No. 61/121,075, filed Dec. 9, 2008, the disclosures of which are incorporated herein by reference in their entireties.

FIELD OF THE INVENTION

The invention relates to vehicles comprising endless tracks for propelling the vehicles.

BACKGROUND

Various types of industrial tracked vehicles exist. One type of tracked vehicle, sometimes referred to as a "tracked carrier vehicle", is used to carry heavy industrial equipment, such as a crane, a ladder, a lift, a drill, and/or any other apparatus to be carried, on various terrains, including rugged terrain.

It is often desirable for a tracked carrier vehicle to have a carrying capacity as large as possible but yet be sized such that the vehicle can fit existing public roads. For example, the tracked carrier vehicle should not be too long; otherwise, it may not be able to negotiate turns on public roads. As another example, the tracked carrier vehicle should be low enough to fit below an underpass (e.g., when the tracked carrier vehicle is transported on a double drop deck trailer).

Current tracked carrier vehicles comprise track assemblies provided with a suspension having four (4) support wheels. The four support wheels are carried by a pair of bogies each carrying two of these wheels. This arrangement usually meets the public roads clearance requirements; however, it has a limited carrying capacity. The carrying capacity limit results from the limited number of support wheels that are used. If the carrying capacity is to be increased, the load per support wheel may exceed a maximal structural limit and reduce the useful life of the wheel or cause a breakage of the wheel in use.

Accordingly, there is a need for a tracked vehicle having a larger payload capacity while being sized such that it can fit on public roads.

SUMMARY OF THE INVENTION

In accordance with a first broad aspect, the invention provides a tracked vehicle comprising: a prime mover; a chassis supporting the prime mover, the chassis comprising a frame extending along a longitudinal direction of the tracked vehicle; and a plurality of track assemblies for traction of the tracked vehicle, a first one of the track assemblies being on a first side of the tracked vehicle, a second one of the track assemblies being on a second side of the tracked vehicle. Each track assembly comprises: (i) a first wheel rotatable about a first axis of rotation, the first axis of rotation being transverse to the longitudinal direction of the tracked vehicle; (ii) a second wheel rotatable about a second axis of rotation, the second wheel being spaced apart from the first wheel along the longitudinal direction of the tracked vehicle, the second axis of rotation being transverse to the longitudinal direction of the tracked vehicle; (iii) a plurality of support wheels arranged in an in-line configuration between the first wheel and the second wheel; (iv) a first bogie carrying a first one of the support wheels and a second one of the support wheels, the first bogie comprising a first link pivotally mounted to the frame about a first pivot axis, the first one of the support wheels being mounted to the first link about a third axis of rotation, the second one of the support wheels being mounted to the first link about a fourth axis of rotation, each of the first pivot axis, the third axis of rotation, and the fourth axis of rotation being transverse to the longitudinal direction of the tracked vehicle; (v) a second bogie carrying a third one of the support wheels, a fourth one of the support wheels, and a fifth one of the support wheels, the second bogie comprising: a second link pivotally mounted to the frame about a second pivot axis, the third one of the support wheels being mounted to the second link about a fifth axis of rotation; and a third link pivotally mounted to the second link about a third pivot axis, the fourth one of the support wheels being mounted to the third link about a sixth axis of rotation, the fifth one of the support wheels being mounted to the third link about a seventh axis of rotation; each of the second pivot axis, the third pivot axis, the fifth axis of rotation, the sixth axis of rotation, and the seventh axis of rotation being transverse to the longitudinal direction of the tracked vehicle; and (vi) an endless track disposed around the first wheel, the second wheel, and the support wheels, the endless track comprising: a top run extending between the first wheel and the second wheel; and a bottom run for engaging the ground, the support wheels engaging the bottom run, the first wheel being a drive wheel to impart movement of the endless track.

In accordance with a second broad aspect, the invention provides a bogie for a tracked vehicle. The tracked vehicle comprises: a prime mover; a chassis supporting the prime mover, the chassis comprising a frame extending along a longitudinal direction of the tracked vehicle; and a plurality of track assemblies for traction of the tracked vehicle, a first one of the track assemblies being on a first side of the tracked vehicle, a second one of the track assemblies being on a second side of the tracked vehicle. The bogie is mountable to the frame as part of a given one of the track assemblies. The given one of the track assemblies comprises: (i) a first wheel rotatable about a first axis of rotation, the first axis of rotation being transverse to the longitudinal direction of the tracked vehicle; (ii) a second wheel rotatable about a second axis of rotation, the second wheel being spaced apart from the first wheel along the longitudinal direction of the tracked vehicle, the second axis of rotation being transverse to the longitudinal direction of the tracked vehicle; (iii) a plurality of support wheels arranged in an in-line configuration between the first wheel and the second wheel; and (iv) an endless track disposed around the first wheel, the second wheel, and the support wheels, the endless track comprising: a top run extending between the first wheel and the second wheel; and a bottom run for engaging the ground, the support wheels engaging the bottom run, the first wheel being a drive wheel to impart movement of the endless track. The bogie carries a first one of the support wheels, a second one of the support wheels, and a third one of the support wheels. The bogie comprises: a first link pivotally mounted to the frame about a first pivot axis, the first one of the support wheels being mounted to the first link about a third axis of rotation; and a second link pivotally mounted to the first link about a second pivot axis, the second one of the support wheels being mounted to the second link about a fourth axis of rotation, the third one of the support wheels being mounted to the second link about a fifth axis of rotation; each of the first pivot axis, the second pivot axis, the third axis of rotation, the fourth axis of rotation, and the fifth axis of rotation being transverse to the longitudinal direction of the tracked vehicle.

In accordance with a third broad aspect, the invention provides a tracked vehicle comprising: a prime mover; a chassis supporting the prime mover, the chassis comprising a frame extending along a longitudinal direction of the tracked vehicle; and a plurality of track assemblies for traction of the tracked vehicle, a first one of the track assemblies being on a first side of the tracked vehicle, a second one of the track assemblies being on a second side of the tracked vehicle. Each of the track assemblies supports a portion of a weight of the tracked vehicle when the tracked vehicle is in use. Each track assembly comprises: (i) a first wheel rotatable about a first axis of rotation, the first axis of rotation being transverse to the longitudinal direction of the tracked vehicle; (ii) a second wheel rotatable about a second axis of rotation, the second wheel being spaced apart from the first wheel along the longitudinal direction of the tracked vehicle, the second axis of rotation being transverse to the longitudinal direction of the tracked vehicle; (iii) a number of support wheels arranged in an in-line configuration between the first wheel and the second wheel, a first one of the support wheels being rotatable about a third axis of rotation transverse to the longitudinal direction of the tracked vehicle, a second one of the support wheels being rotatable about a fourth axis of rotation transverse to the longitudinal direction of the tracked vehicle, a third one of the support wheels being rotatable about a fifth axis of rotation transverse to the longitudinal direction of the tracked vehicle, a fourth one of the support wheels being rotatable about a sixth axis of rotation transverse to the longitudinal direction of the tracked vehicle, a fifth one of the support wheels being rotatable about a seventh axis of rotation transverse to the longitudinal direction of the tracked vehicle, the support wheels being mounted such that, when the tracked vehicle is in use, the portion of the weight of the tracked vehicle supported by the track assembly is never applied to only one of the support wheels; (iv) an endless track disposed around the first wheel, the second wheel, and the support wheels, the endless track comprising: a top run extending between the first wheel and the second wheel; and a bottom run for engaging the ground, the support wheels engaging the bottom run, the first wheel being a drive wheel to impart movement of the endless track.

In accordance with a fourth broad aspect, the invention provides a tracked vehicle comprising: a prime mover; a chassis supporting the prime mover, the chassis comprising a frame extending along a longitudinal direction of the tracked vehicle; and a plurality of track assemblies for traction of the tracked vehicle, a first one of the track assemblies being on a first side of the tracked vehicle, a second one of the track assemblies being on a second side of the tracked vehicle. Each track assembly comprises: (i) a first wheel rotatable about a first axis of rotation, the first axis of rotation being transverse to the longitudinal direction of the tracked vehicle; (ii) a second wheel rotatable about a second axis of rotation, the second wheel being spaced apart from the first wheel along the longitudinal direction of the tracked vehicle, the second axis of rotation being transverse to the longitudinal direction of the tracked vehicle; (iii) a plurality of support wheels arranged in an in-line configuration between the first wheel and the second wheel; (iv) a first bogie carrying a first one of the support wheels and a second one of the support wheels, the first bogie being pivotally mounted to the frame about a first pivot axis, the first one of the support wheels being rotatable about a third axis of rotation, the second one of the support wheels being rotatable about a fourth axis of rotation, each of the first pivot axis, the third axis of rotation, and the fourth axis of rotation being transverse to the longitudinal direction of the tracked vehicle; (v) a second bogie carrying a third one of the support wheels, a fourth one of the support wheels, and a fifth one of the support wheels, the second bogie being spaced apart from the first bogie along the longitudinal direction of the tracked vehicle and being pivotally mounted to the frame about a second pivot axis, the third one of the support wheels being rotatable about a fifth axis of rotation, the fourth one of the support wheels being rotatable about a sixth axis of rotation, the fifth one of the support wheels being rotatable about a seventh axis of rotation, each of the second pivot axis, the fifth axis of rotation, the sixth axis of rotation, and the seventh axis of rotation being transverse to the longitudinal direction of the tracked vehicle; and (vi) an endless track disposed around the first wheel, the second wheel, and the support wheels, the endless track comprising: a top run extending between the first wheel and the second wheel; and a bottom run for engaging the ground, the support wheels engaging the bottom run, the first wheel being a drive wheel to impart movement of the endless track.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIG. 8 shows another perspective view of the wheel-carrying assembly without the support wheels;

FIG. 9 shows another perspective view of the wheel-carrying assembly without the support wheels and with some members removed; and FIGS. 10A to 10F, 11A to 11D, and 12A to 12D show examples of operation of the track assembly of the tracked vehicle when the tracked vehicle encounters an obstacle on the ground.

Figure 2:
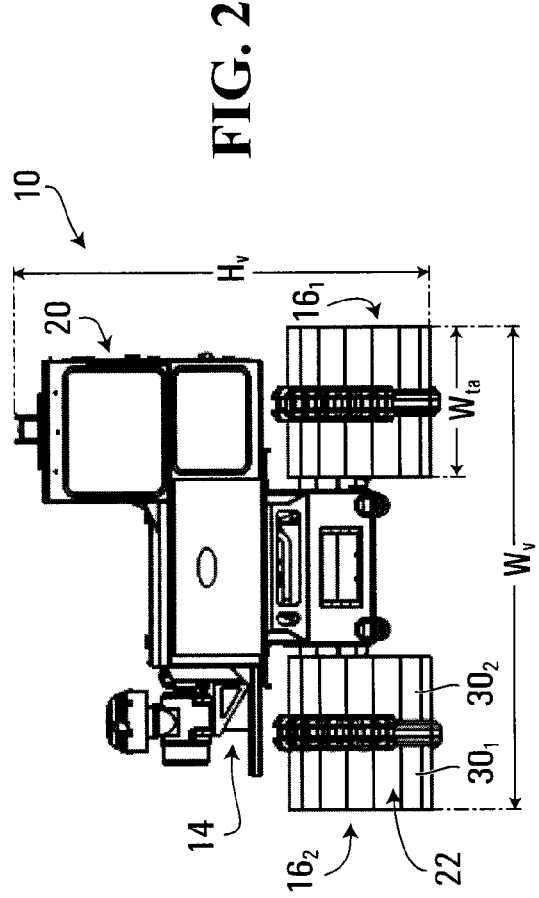
FIG. 2 shows a front view of the tracked vehicle.

In the drawings, embodiments of the invention are illustrated by way of example. It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
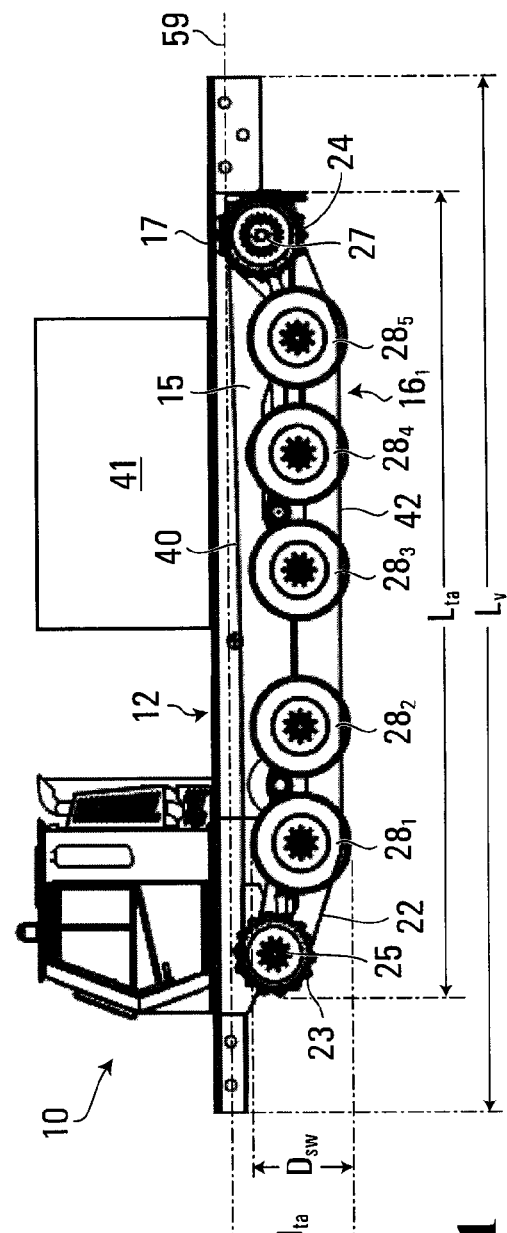
FIG. 1 shows a side view of an example of a tracked vehicle in accordance with an embodiment of the invention.

FIGS. 1 and 2 show an example of a tracked vehicle 10 in accordance with an embodiment of the invention. In this embodiment, the tracked vehicle 10 is a tracked carrier vehicle designed to carry industrial equipment 41, such as, for example, a crane, a ladder, a lift, a drill, and/or any other apparatus to be carried, on various terrains, including rugged terrain (e.g., with mud, steep hills, swamps, rocks, mud, and/or snow).

The tracked vehicle 10 has a length $L_v$, a width $W_v$, and a height $H_v$. These overall dimensions of the tracked vehicle 10 may allow the vehicle 10 to have a large payload capacity while being able to be used in a public road infrastructure. For example, in some embodiments, the length $L_v$ may be at least 6 m, such as between 6 m and 12 m, in some cases between 7 m and 11 m, and in some cases between 8 m and 10 m; the width $W_v$ may be at least 2 m, such as between 2 m and 5 m, in some cases between 2.5 m and 4.5 m, and in some cases between 3 m and 4 m; and the height $H_v$ may be no more than 4.5 m, in some cases no more than 4 m, and in some cases no more than 3.5 m. The length $L_v$, width $W_v$, and height $H_v$ may take on various other values in other embodiments.

The tracked vehicle 10 has a payload capacity which can be quite large, notably due to an arrangement of support wheels which is discussed later. For example, in some embodiments, the payload capacity of the tracked vehicle 10 may be at least 40000 lbs (about 18150 kg), in some cases at least 42000 lbs (about 19050 kg), and in some cases at least 44000 lbs (19950 kg). The payload capacity may take on various other values in other embodiments.

For example, in this embodiment, the tracked vehicle 10 is designed such that its length $L_v$ is about 9.5 m, its width $W_v$ is about 3.5 m, and its height $H_v$ is about 3 m, it has a curb weight (i.e., a weight without the industrial equipment 41 to be carried) of about 34500 lbs (about 15650 kg), and its payload capacity is about 46000 lbs (about 20850 kg). The payload capacity of the tracked vehicle 10 is thus quite large, yet the dimensions of the tracked vehicle 10 may allow it to fit a public road infrastructure. These values of the dimensions, curb weight and payload capacity of the tracked vehicle 10 are presented for illustrative purposes only since the dimensions, curb weight and payload capacity of the tracked vehicle 10 can have various other values in other embodiments.

The tracked vehicle 10 comprises a chassis 12 supporting a prime mover 14, a plurality of track assemblies $16_1$, $16_2$, and an operator cabin 20, which comprises controls allowing an operator to move the tracked vehicle 10 on the ground and, in some cases, control the industrial equipment 41 carried by the tracked vehicle 10.

The chassis 12 comprises a frame 15 extending along a longitudinal axis 59 of the tracked vehicle 10. The tracked vehicle 10 has a longitudinal direction (i.e., a direction generally parallel to the longitudinal axis 59) and transversal directions (i.e., directions transverse to the longitudinal axis 59), including a widthwise direction (i.e., a lateral direction generally perpendicular to the longitudinal axis 59).

The prime mover 14 generates power to move the tracked vehicle 10. For example, the prime mover 14 may comprise an internal combustion engine and/or one or more other types of motors (e.g., electric motors, etc.) for generating motive power to move the tracked vehicle 10. The prime mover 14 is in a driving relationship with each of the track assemblies $16_1$, $16_2$. That is, power derived from the prime mover 14 is transmitted to each of the track assemblies $16_1$, $16_2$ via a power train of the tracked vehicle 10 in order to drive the track assemblies $16_1$, $16_2$.

In this embodiment, the prime mover 14 and the operator cabin 20 are mounted in a front region of the tracked vehicle 10. By locating the operator cabin 20 and the prime mover 14 at one end of the chassis 12, a significant amount of space remains on the chassis 12 to receive the industrial equipment 41 to be carried. A deck 17 is provided on the chassis 12 behind the prime mover 14 and the operator cabin 20 to support the industrial equipment 41 to be carried. The prime mover 14 and/or the operator cabin 20 may be located elsewhere on the chassis 12 in other embodiments.

The track assemblies $16_1$, $16_2$ are used to propel the tracked vehicle 10 on the ground. The track assembly $16_1$ is on a first side of the tracked vehicle 10, while the track assembly $16_2$ is on a second side of the tracked vehicle 10. Each of the track assemblies $16_1$, $16_2$ supports a portion of a weight of the tracked vehicle 10 when the tracked vehicle 10 is in use. In this example, the track assemblies $16_1$, $16_2$ are similarly configured and are disposed symmetrically relative to the chassis 12 and thus the portion of the weight of the tracked vehicle 10 supported by each of the track assemblies $16_1$, $16_2$ is about half of the weight of the tracked vehicle 10. In other examples, the portion of the weight of the tracked vehicle 10 supported by each of the track assemblies $16_1$, $16_2$ may be other than one-half of the weight of the tracked vehicle 10.

Figure 3:
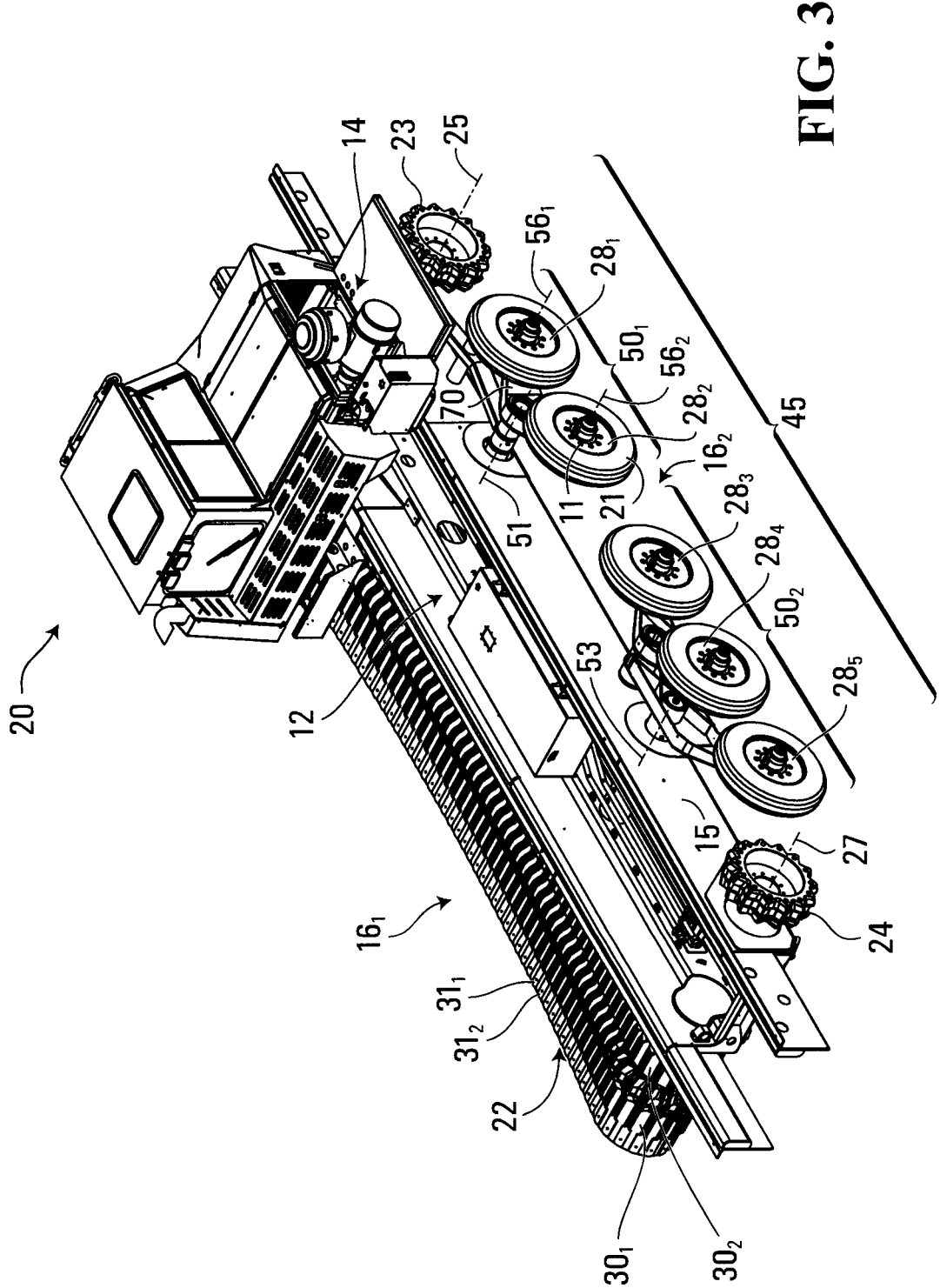
FIG. 3 shows a perspective view of the tracked vehicle, in which a track of a track assembly of the tracked vehicle has been removed for clarity.
Figure 5:
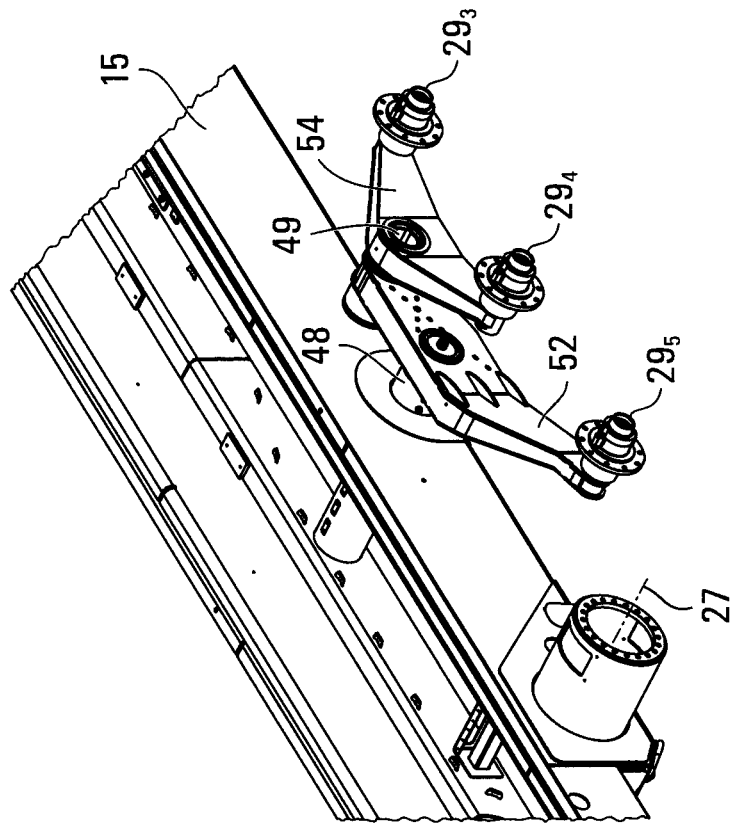
FIG. 5 shows a perspective view of the wheel-carrying assembly without the support wheels.
Figure 4:
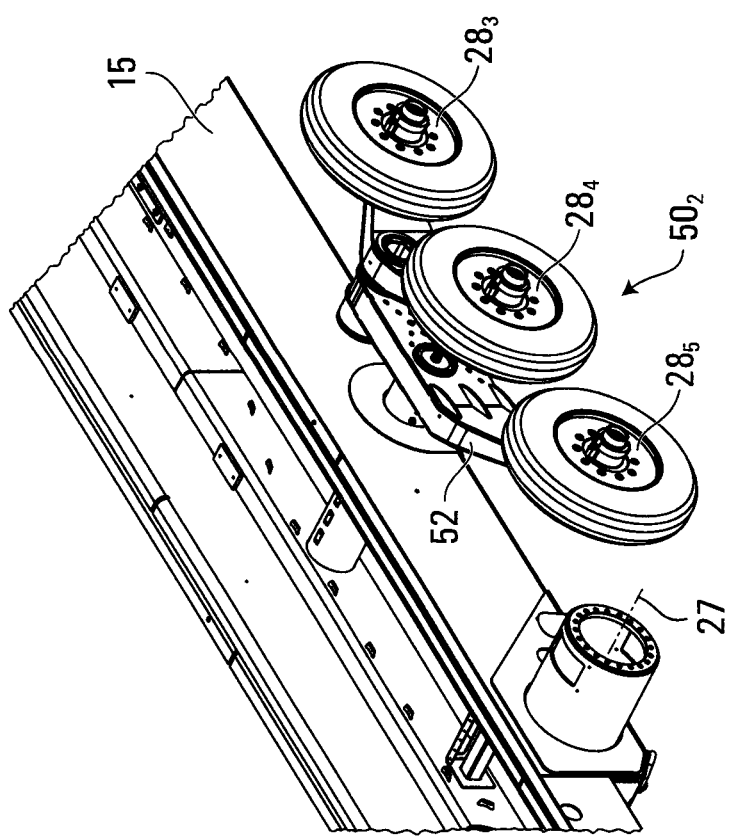
FIG. 4 shows a perspective view of a wheel-carrying assembly of the track assembly, the wheel-carrying assembly being mounted to a frame of the tracked vehicle and carrying three (3) support wheels.
Figure 6:
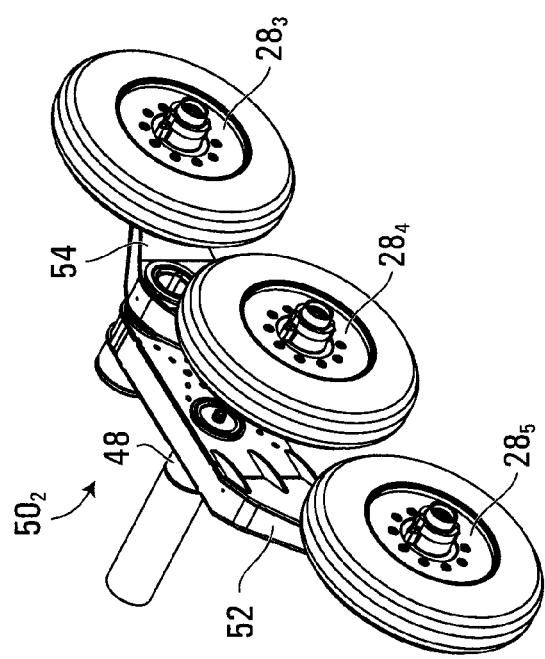
FIG. 6 shows another perspective view of the wheel-carrying assembly.
Figure 7:
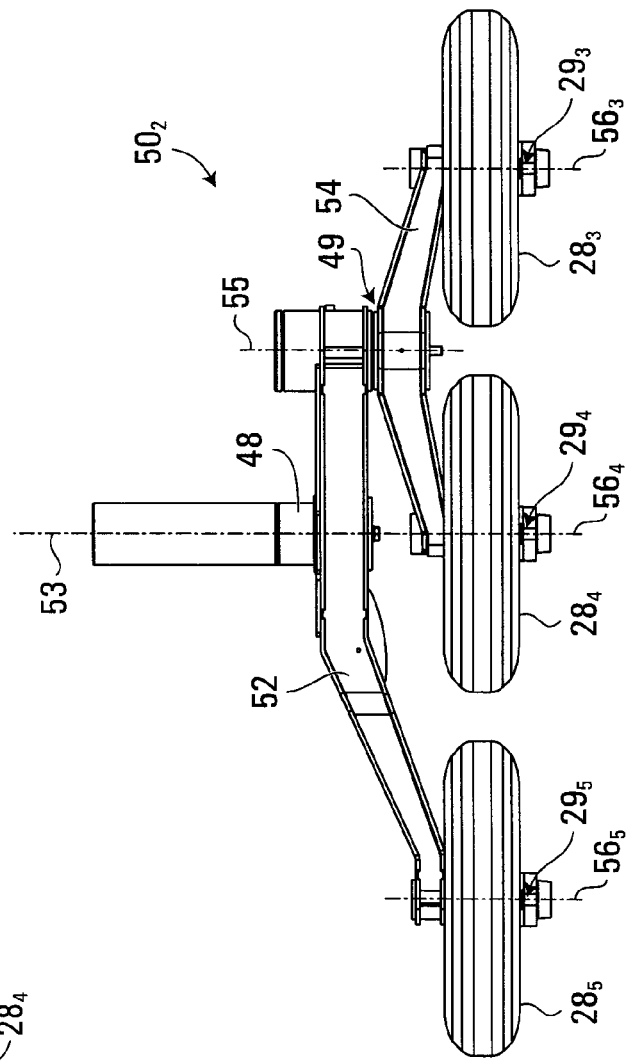
FIG. 7 shows a top view of the wheel-carrying assembly.

With additional reference to FIG. 3, in this embodiment, each track assembly $16_i$ comprises a drive wheel 24, an idler wheel 23, a support wheel arrangement 45 comprising five (5) support wheels $28_1$-$28_5$, and an endless track 22 disposed around the wheels 24, 23, $28_1$-$28_5$ (in FIG. 3, the endless track 22 on the right side of the tracked vehicle 10, as well as the deck 17 and the industrial equipment 41, have been removed for clarity).

The track assembly $16_i$ has a longitudinal direction which is generally parallel to the longitudinal direction of the tracked vehicle 10 (i.e., the longitudinal direction of the track assembly $16_i$ is generally parallel to the longitudinal axis 59). The track assembly $16_i$ also has transversal directions, including a widthwise direction which is generally parallel to the widthwise direction of the tracked vehicle 10 (i.e., the widthwise direction of the track assembly $16_i$ is generally perpendicular to the longitudinal axis 69). As shown in FIGS. 1 and 2, the track assembly $16_i$ has a length $L_{ta}$, a width $W_{ta}$, and a height $H_{ta}$.

When the endless track 22 is installed around the wheels 24, 23, $28_1$-$28_5$, it comprises a top run 40 and a bottom run 42. The top run 40 and the bottom run 42 of the endless track 22 are generally parallel to one another and extend along the longitudinal direction of the tracked vehicle 10. The top run 40 of the endless track 22 is generally horizontal and has a length that is generally defined by the distance between the drive wheel 24 and the idler wheel 23. The bottom run 42 of the endless track 22 is the portion of the endless track 22 that is beneath the support wheels $28_1$-$28_5$ and that engages the ground. The bottom run 42 of the endless track 22 has a length that is generally defined by the distance between a frontmost one of the support wheel $28_1$-$28_5$, in this case, the support wheel $28_1$, and a rearmost one of the support wheel $28_1$-$28_5$, in this case, the support wheel $28_5$.

The drive wheel 24 is in a driven relationship with the prime mover 14 via a power train (e.g., a transmission such as a hydrostatic transmission or other suitable transmission) to impart movement of the endless track 22 in order to propel the tracked vehicle 10 on the ground. The drive wheel 24 is rotatable about an axis of rotation 27, which is transverse to the longitudinal direction of the tracked vehicle 10, by power derived from the prime mover 14 to impart movement of the endless track 22. In this embodiment, the drive wheel 24, which is located in a rear region of the chassis 12, comprises a sprocket having teeth that engage the endless track 22. The drive wheel 24 may be configured in various other ways in other embodiments.

The idler wheel 23 does not convert power derived from the prime mover 14 to motive force for movement of the endless track 22, but rather guides the endless track 22 and maintains it under tension as it is driven by the drive wheel 24. The idler wheel 23 is rotatable about an axis of rotation 25, which is transverse to the longitudinal direction of the tracked vehicle 10. In this embodiment, the idler wheel 23, which is located in a front region of the chassis 12, comprises a sprocket having teeth that engage the endless track 22. The idler wheel 23 may be configured in various other ways in other embodiments.

The support wheels $28_1$-$28_5$ are arranged in an in-line configuration extending along the longitudinal direction of tracked vehicle 10 and roll on the bottom run 42 of the endless track 22 as the tracked vehicle 10 moves on the ground. The support wheels $28_1$-$28_5$ do not convert power derived from the prime mover 14 to motive force for movement of the endless track 22, but rather support and distribute onto the ground (via the endless track 22) the portion of the weight of the tracked vehicle 10 that is supported by the track assembly $16_i$. The support wheels $28_1$-$28_5$ may also maintain the shape and position of the endless track 22, as well as keep the track 22 generally aligned with the general direction of vehicular movement.

Each of the support wheels $28_1$-$28_5$ occupies most of the height $H_{ta}$ of the track assembly $16_i$. That is, each of the support wheels $28_1$-$28_5$ has a diameter $D_{sw}$ corresponding to more than half, in some cases more than two-thirds, and in some cases more than three-quarters of the height $H_{ta}$ of the track assembly $16_i$. In this case, the diameter $D_{sw}$ of each of the support wheels $28_1$-$28_5$ corresponds to more than 80% of the height $H_{ta}$ of the track assembly $16_i$. In some embodiments, the diameter $D_{sw}$ of each of the support wheels $28_1$-$28_5$ may be such that the top run 40 of the endless track 22 can contact the support wheels $28_1$-$28_5$. In other embodiments, the support wheels $28_1$-$28_5$ may be made smaller such that there is no contact between the top run 40 of the endless track 22 and the support wheels $28_1$-$28_5$.

In this embodiment, each of the support wheels $28_1$-$28_5$ comprises a hub 11 and a tire 21, which in this case is an off-the-road (OTR) tire. Generally, the tire 21 may be pneumatic or solid and may be made of rubber and/or other materials (e.g., metals, plastics, or composites). Each of the support wheels $28_1$-$28_5$ may be constructed in various other ways in other embodiments.

The endless track 22 provides traction of the tracked vehicle 10 on the ground. More particularly, as the drive wheel 24 is rotated by power derived from the prime mover 14, the drive wheel 24 imparts motion of the endless track 22 for traction of the vehicle 10 on the ground. The endless track 22 has an inner side facing the wheels 24, 23, $28_1$-$28_5$ and a ground-engaging outer side, opposite the inner side 32, for engaging the ground on which the tracked vehicle 10 travels.

In this embodiment, the endless track 22 comprises a pair of belts $30_1$, $30_2$ spaced apart from one another to accommodate the drive wheel 24, the idler wheel 23 and the support wheels $28_1$-$28_5$. The endless track 22 also comprises a series of cross-links $31_1$-$31_N$ distributed longitudinally along the track 22 and extending transversally to interconnect the belts $30_1$, $30_2$.

Each of the belts $30_1$, $30_2$ comprises rubber and/or other elastomeric material. The belts $30_1$, $30_2$ may be constructed in other ways in other embodiments (e.g., each of the belts $30_1$, $30_2$ may comprise reinforcements such as cables embedded in the rubber and/or other elastomeric material, or may comprise a plurality of parts, such as elastomeric and/or metallic sections, interconnected to one another to form the belt). Also, while in this embodiment the endless track 22 comprises two belts $30_1$, $30_2$, in other embodiments, the track 22 may comprise a single belt or three or more such belts.

The cross-links $31_1$-$31_N$ interconnect the belts $30_1$, $30_2$ and interact with the wheels 24, 23, $28_1$-$28_5$ as the endless track 22 moves in an endless path around these wheels. In particular, the cross-links $31_1$-$31_N$ interact with the drive wheel 24 to cause the track 22 to be driven by the drive wheel 24. More specifically, in this case, as the drive wheel 24 rotates, individual ones of the cross-links $31_1$-$31_N$ engage recesses between the teeth of the drive wheel 24, thereby causing the track 22 to be driven. In addition, as the track 22 moves around its endless path, individual ones of the cross-links $31_1$-$31_N$ on the bottom run 42 of the track 22 engage the ground and contribute to traction of the tracked vehicle 10 on the ground.

The support wheels $28_1$-$28_5$ are carried by a plurality of wheel-carrying assemblies $50_1$, $50_2$ of the track assembly $16_i$. Each of the wheel-carrying assemblies $50_1$, $50_2$ carries two or more of the support wheels $28_1$-$28_5$. More particularly, in this embodiment, the wheel-carrying assembly $50_1$ carries two of the support wheels $28_1$-$28_5$, namely the support wheels $28_1$, $28_2$, and the wheel-carrying assembly $50_2$ carries three of the support wheels $28_1$-$28_5$, namely the support wheels $28_3$-$28_5$. Since it is an assembly carrying wheels, each of the wheel-carrying assemblies $50_1$, $50_2$ will be referred to as a "bogie". The bogie $50_1$ is pivotally mounted to the frame 15 of the tracked vehicle 10 about a pivot axis 51. The bogie $50_2$ is pivotally mounted to the frame 15 of the tracked vehicle 10 about a pivot axis 53. Each of the pivot axes 51, 53 extends transversally to the longitudinal direction of the tracked vehicle 10.

The bogie $50_2$ will be described in greater detail with additional reference to FIGS. 4 to 9. The bogie $50_2$ comprises a link 52 pivotally mounted to the frame 15 of the tracked vehicle 10 via a pivot 48, which defines the pivot axis 53. The support wheel $28_5$ is rotatably mounted to the link 52 via an axle $29_5$, which defines an axis of rotation $56_5$ of the support wheel $28_5$. The support wheel $28_5$ can turn with respect to the link 52 about the axis of rotation $56_5$, which is transverse to the longitudinal direction of the tracked vehicle 10.

In addition, the bogie $50_2$ comprises a link 54 pivotally mounted to the link 52 via a pivot 49, which defines a pivot axis 55 that is transverse to the longitudinal direction of the tracked vehicle 10. The support wheels $28_3$, $28_4$ are rotatably mounted to the link 54 via respective axles $29_3$, $29_4$ which define respective axes of rotation $56_3$, $56_4$ of the support wheels $28_3$, $28_4$. The support wheels $28_3$, $28_4$ can turn with respect to the link 54 about the axes of rotation $56_3$, $56_4$, which are transverse to the longitudinal direction of the tracked vehicle 10. In this embodiment, the pivot axis 55 lies equidistant between and somewhat above the axis of rotation $56_3$ and the axis of rotation $56_4$. The pivot axis 55 and the axes of rotation $56_3$, $56_4$ may be positioned differently in relation to one another in other embodiments.

The link 52 can thus pivot with respect to the chassis 12 about the pivot axis 53, with the support wheel $29_5$ and the link 54 being located on either side of the pivot axis 53, while the link 54 (and therefore the support wheels $28_3$, $28_4$) can pivot relative to the link 52 about the pivot axis 55.

Each of the links 52, 54 comprises a connecting structure that may have any suitable form. For example, in various embodiments, the connecting structure may comprise a single member or a plurality of interconnected members (e.g., a plurality of members connected to one another by one or more fasteners, welding, etc.). The single member or the plurality of interconnected members may be made of only one material or of different materials and may be manufactured using various processes.

More particularly, in this embodiment, the link 52 comprises an elongated structure including a plurality of members $60_1$-$60_M$ connected to one another. In this example, the members $60_1$-$60_M$ are metallic members connected to one another by welding. Also, in this example, a reinforcement 61 is provided to reinforce the link 52. In this case, the reinforcement 61 comprises a pair of bracing members $62_1$, $62_2$ interconnecting lower and upper ones of the members $60_1$-$60_M$. The axis of rotation $56_5$ of the support wheel $28_5$ is located at one end of the elongated structure, while the pivot axis 55 of the link 54 is located at an opposite end of the elongated structure.

Similarly, in this embodiment, the link 54 comprises an elongated structure including a plurality of members $63_1$-$63_P$ connected to one another. In this example, the members $63_1$-$63_P$ are metallic members connected to one another by welding. The axis of rotation $56_3$ of the support wheel $28_3$ is located at one end of the elongated structure, while the axis of rotation $56_4$ of the support wheel $28_4$ is located at an opposite end of the elongated structure.

In this embodiment, the support wheels $28_3$-$28_5$ are arranged in the bogie $50_2$ such that, along the longitudinal direction of the tracked vehicle 10, a spacing of adjacent ones of the support wheels $28_3$-$28_5$ is constant. More specifically, along the longitudinal direction of the tracked vehicle, the distance between the support wheel $28_3$ and the support wheel $28_4$ is the same as the distance between the support wheel $28_4$ and the support wheel $28_5$. Thus, in this case, along the longitudinal direction of the tracked vehicle 10, the distance between the axis of rotation $56_3$ and the axis of rotation $56_4$ is identical to the distance between the axis of rotation $56_4$ and the axis of rotation $56_5$.

Also, in this embodiment, the pivot axis 53 is aligned with the axis of rotation $56_4$ of the support wheel $28_4$, which is a center one of the support wheels $28_3$-$28_5$. This alignment allows a uniform load distribution among the support wheels $28_3$-$28_5$.

While the links 52, 54, the support wheels $28_3$-$28_5$, and the pivot axes 53, 55 are disposed relative to one another in a certain way in this embodiment, they may be disposed relative to one another in various other ways in other embodiments. For example, in some embodiments, the pivot axis 53 of the link 52 may not be aligned with the axis of rotation $56_4$ of the support wheel $28_4$; rather, it may be offset from the axis of rotation $56_4$ of the support wheel $28_4$. As another example, in some embodiments, along the longitudinal direction of the tracked vehicle 10, the distance between the axis of rotation $56_3$ and the axis of rotation $56_4$ may be different from the distance between the axis of rotation $56_4$ and the axis of rotation $56_5$. As yet another example, in some embodiments, the orientation of the link 52, which carries the support wheel $29_5$, may be reversed such that the link 52 faces front and the support wheel $29_5$ is positioned in front of the support wheels $28_3$, $28_4$ (i.e., starting from the front of the vehicle 10, the support wheels $28_1$-$28_5$ are arranged as follows: the support wheel $28_1$, the support wheel $28_2$, the support wheel $28_5$, the support wheel $28_3$, and the support wheel $28_4$, with the pivot axis 53 being aligned with the axis of rotation $29_3$ of the support wheel $28_3$).

The support wheels $28_3$-$28_5$ allow the bogie $50_2$ to overcome obstacles that may lie on the ground, such as bumps or other abrupt changes in ground level, rocks, or tree branches or trunks, etc., when the tracked vehicle 10 moves.

For example, when the support wheel $28_5$ is forced upwards at a given angle such as when it first contacts an obstacle on the ground, the link 52 is forced to pivot about the pivot axis 53. This pivotal movement induces a reaction force from the link 54. In this way, even though the support wheel $28_5$ moves up to overcome the obstacle, the loading of the support wheel $28_5$ does not change. The arrangement is such that, irrespective of the vertical position of the support wheel $28_5$, the loading of the support wheels $28_3$-$28_5$ remains substantially constant. In this example, the geometry is such that the weight supported by the bogie $50_2$ is equally distributed among the support wheels $28_3$-$28_5$.

A similar operation occurs when one of the support wheels $28_3$, $28_4$ is forced upwards as it contacts an obstacle. The support wheel $28_3$ or $28_4$ moves up but, again, the loading of the support wheels $28_3$-$28_5$ stays the same.

As shown in FIG. 3, in this embodiment, the bogie $50_1$ comprises a link 70 pivotally connected to the frame 15 of the tracked vehicle 10 via a pivot 71, which defines the pivot axis 51. The support wheels $28_1$, $28_2$ are rotatably mounted to the link 70 via respective axles $29_1$, $29_2$ which define respective axes of rotation $56_1$, $56_2$ of the support wheels $28_1$, $28_2$. The support wheels $28_1$, $28_2$ can turn with respect to the link 70 about the axes of rotation $56_1$, $56_1$, which are transverse to the longitudinal direction of the tracked vehicle 10. In this embodiment, the pivot axis 51 lies equidistant between and somewhat above the axis of rotation $56_1$ and the axis of rotation $56_2$. The pivot axis 51 and the axes of rotation $56_1$, $56_2$ may be positioned differently in relation to one another in other embodiments.

In this embodiment, along the longitudinal direction of the tracked vehicle 10, a spacing of the support wheels $28_1$, $28_2$ of the bogie $50_1$ is the same as the spacing of adjacent ones of the support wheels $28_3$-$28_5$ of the bogie $50_2$.

Like the bogie $50_2$, the bogie $50_1$ can accommodate a vertical deflection of any one of the support wheels $28_1$, $28_2$ without changing the loadings of the support wheels $28_1$, $28_2$. In this example, the geometry is such that the weight supported by the bogie $50_1$ is equally distributed among the support wheels $28_1$, $28_2$.

An example of operation of the track assembly $16_i$, and in particular the support wheel arrangement 45, will be described in connection with FIGS. 10A to 10F. In this example, it is assumed that there is an obstacle (e.g., a bump or other abrupt change in ground level, a rock, a fallen tree, etc.) lying in front of the tracked vehicle 10 that is in motion. It is further assumed that the orientation of the link 52, which carries the support wheel $29_5$, is reversed such that, starting from the front of the vehicle 10, the support wheels $28_1$-$28_5$ are arranged as follows: the support wheel $28_1$, the support wheel $28_2$, the support wheel $28_5$, the support wheel $28_3$, and the support wheel $28_4$.

Each of the support wheels $28_1$-$28_5$ must mount, ride over and then dismount the obstacle in order to overcome it.

As the support wheel $28_1$ comes in contact with the obstacle (FIG. 10B), the pivot axis 51 allows the support wheel $28_1$ to move upwardly. However, in spite of this vertical movement, the loading on the support wheel $28_1$ does not change and it is the same as the loading on the support wheel $28_2$. A similar situation occurs when the support wheel $28_2$ encounters the obstacle (FIG. 10C). The support wheel $28_2$ moves up but its loading stays the same.

Then, as the support wheel $28_5$ comes into contact with the obstacle (FIG. 10D), the pivot axis 53 allows the support wheel $28_5$ to pivot upwards in order to mount and overcome the obstacle. While this pivoting movement occurs, the loading of the support wheels $28_3$-$28_5$ does not change.

Once the support wheel $28_5$ has overcome the obstacle, the support wheels $28_3$, $28_4$ come respectively into contact with the obstacle (FIGS. 10E and 10F). When either of the support wheels $28_3$, $28_4$ encounters the obstacle, the pivot axis 55 allows that support wheel to pivot upwards in order to mount and overcome the obstacle. However, the loading of the support wheels $28_3$, $28_4$ does not change.

FIGS. 11A to 11D and 12A to 12D illustrate examples of operation of the track assembly $16_i$ when the track vehicle 10 negotiates other types of obstacles.

Accordingly, in this embodiment, owing to its five (5) support wheels on each side, the tracked vehicle 10 can be used to carry significant payloads (e.g., 40000 lbs or more) over various types of terrain in various applications where low ground pressure and traction is needed.

The support wheel arrangement 45 of each track assembly $16_i$ ensures that, in use, the portion of the weight of the tracked vehicle 10 supported by the track assembly $16_i$ is never applied to a single one (i.e., only one) of the support wheels $28_1$-$28_5$. Specifically, in this embodiment, in use, each of the support wheels $28_1$-$28_5$ of the track assembly $16_i$ always bears some of the portion of the weight of the tracked vehicle 10 supported by the track assembly $16_i$.

The support wheels $28_1$-$28_5$ of each track assembly $16_i$ can be arranged such as not to exceed a certain inter-support-wheel spacing while at the same time avoiding the necessity to use an excessive number of support wheels. This can be particularly useful for tracked vehicles that are used primarily off-road but that occasionally also need to be driven or transported on public roads and need to be kept within certain maximal length, width and height dimensions in order to fit an existing public road infrastructure.

Each track assembly $16_i$ of the tracked vehicle 10 may be configured in various other ways in other embodiments.

For example, while in the embodiment considered above the three-wheel bogie $50_2$ is placed in the back and the two-wheel bogie $50_1$ is placed in the front, in other embodiments, this may be reversed such that the bogie $50_2$ is placed in the front and the bogie $50_1$ is placed in the back.

As another example, although in the embodiment considered above each track assembly $16_i$ comprises five (5) support wheels $28_1$-$28_5$, each track assembly $16_i$ may comprise more than five support wheels in other embodiments. In particular, each track assembly $16_i$ may comprise an odd number of support wheels which is greater than or equal to five (5) while ensuring that, in use, the portion of the weight of the tracked vehicle 10 supported by the track assembly $16_i$ is never applied to only one of these support wheels. Thus, in some embodiments, in use, each of the odd number of support wheels of the track assembly $16_i$ always bears some of the portion of the weight of the tracked vehicle 10 supported by the track assembly $16_i$.

As yet another example, while in the embodiment considered above the drive wheel 24 of each track assembly $16_i$ is located in a rear region of the chassis 12 and the idler wheel 23 of the track assembly $16_i$ is located in a front region of the chassis 12, this may be reversed in other embodiments such that the drive wheel 24 of the track assembly $16_i$ is located in a front region of the chassis 12 and the idler wheel 23 of the track assembly $16_i$ is located in a rear region of the chassis 12.

As yet another example, while in the embodiment considered above each track assembly $16_i$ comprises the drive wheel 24 that is in a driven relationship with the prime mover 14 and the idler wheel 23 that is not in a driven relationship with the prime mover 14, in other embodiments, the idler wheel 23 may be replaced by another drive wheel that is in a driven relationship with the prime mover 14. In other words, in these embodiments, the track assembly $16_i$ comprises a drive wheel at each of its longitudinal ends.

Although various embodiments have been illustrated, this was for the purpose of describing, but not limiting, the invention. Various modifications will become apparent to those skilled in the art and are within the scope of this invention, which is defined by the following claims.

The invention claimed is:

1. A tracked vehicle comprising:
   a) a prime mover;
   b) a chassis supporting the prime mover, the chassis comprising a frame extending along a longitudinal direction of the tracked vehicle;
   c) a plurality of track assemblies for traction of the tracked vehicle, a first one of the track assemblies being on a first side of the tracked vehicle, a second one of the track assemblies being on a second side of the tracked vehicle, each track assembly comprising:
      i) a first wheel rotatable about a first axis of rotation, the first axis of rotation being transverse to the longitudinal direction of the tracked vehicle;
      ii) a second wheel rotatable about a second axis of rotation, the second wheel being spaced apart from the first wheel along the longitudinal direction of the tracked vehicle, the second axis of rotation being transverse to the longitudinal direction of the tracked vehicle;
      iii) a plurality of support wheels arranged in an in-line configuration between the first wheel and the second wheel;
      iv) a first bogie carrying a first one of the support wheels and a second one of the support wheels, the first bogie being pivotally mounted to the frame about a first pivot axis, the first one of the support wheels being rotatable about a third axis of rotation, the second one of the support wheels being rotatable about a fourth axis of rotation, each of the first pivot axis, the third axis of rotation, and the fourth axis of rotation being transverse to the longitudinal direction of the tracked vehicle;
      v) a second bogie carrying a third one of the support wheels, a fourth one of the support wheels, and a fifth one of the support wheels, the second bogie being spaced apart from the first bogie along the longitudinal direction of the tracked vehicle and being pivotally mounted to the frame about a second pivot axis, the third one of the support wheels being rotatable about a fifth axis of rotation, the fourth one of the support wheels being rotatable about a sixth axis of rotation, the fifth one of the support wheels being rotatable about a seventh axis of rotation, each of the second pivot axis, the fifth axis of rotation, the sixth axis of rotation, and the seventh axis of rotation being transverse to the longitudinal direction of the tracked vehicle; and
      vi) an endless track disposed around the first wheel, the second wheel, and the support wheels, the endless track comprising:
         i. a top run extending between the first wheel and the second wheel; and
         ii. a bottom run for engaging the ground, the support wheels engaging the bottom run,
      the first wheel being a drive wheel to impart movement of the endless track.

2. A tracked vehicle as claimed in claim 1, wherein the second bogie comprises:
   i. a first link pivotally mounted to the frame about the second pivot axis, the third one of the support wheels being mounted to the first link about the fifth axis of rotation; and ii. a second link pivotally mounted to the first link about a third pivot axis, the fourth one of the support wheels being mounted to the second link about the sixth axis of rotation, the fifth one of the support wheels being mounted to the second link about the seventh axis of rotation, the third pivot axis being transverse to the longitudinal direction of the tracked vehicle.

3. A tracked vehicle as claimed in claim 2, wherein each of the first link and the second link comprises a plurality of members connected to one another.

4. A tracked vehicle as claimed in claim 3, wherein the first link comprises a reinforcement.

5. A tracked vehicle as claimed in claim 4, wherein the reinforcement comprises a pair of bracing members interconnecting lower and upper ones of the members of the first link.

6. A tracked vehicle as claimed in claim 2, wherein the third pivot axis is equidistant to the sixth axis of rotation and the seventh axis of rotation.

7. A tracked vehicle as claimed in claim 1, wherein the track assembly has a length, a width and a height, each of the support wheels having a diameter corresponding to more than half of the height of the track assembly.

8. A tracked vehicle as claimed in claim 7, wherein the diameter of each of the support wheels corresponds to more than two-thirds of the height of the track assembly.

9. A tracked vehicle as claimed in claim 8, wherein the diameter of each of the support wheels corresponds to more than three-quarters of the height of the track assembly.

10. A tracked vehicle as claimed in claim 1, wherein the endless track comprises: a first belt and a second belt spaced apart from one another to accommodate the first wheel, the second wheel, and the support wheels; and a plurality of cross-links distributed along a longitudinal direction of the endless track and extending transversally to the longitudinal direction of the endless track to interconnect the first belt and the second belt.

11. A tracked vehicle as claimed in claim 10, wherein each of the first belt and the second belt comprises elastomeric material.

12. A tracked vehicle as claimed in claim 1, wherein the second wheel is an idler wheel.

13. A tracked vehicle as claimed in claim 1, wherein the drive wheel is a first drive wheel, the second wheel being a second drive wheel to impart movement of the endless track.

14. A tracked vehicle as claimed in claim 1, wherein each of the first wheel and the second wheel is a sprocket.

15. A tracked vehicle as claimed in claim 1, wherein each of the support wheels has a diameter such that the top run of the endless track can contact the support wheels.

16. A tracked vehicle as claimed in claim 1, wherein each of the support wheels comprises a hub and a tire.

17. A tracked vehicle as claimed in claim 1, wherein the first pivot axis and the second pivot axis are located above the third axis of rotation, the fourth axis of rotation, the fifth axis of rotation, the sixth axis of rotation, and the seventh axis of rotation.

18. A tracked vehicle as claimed in claim 1, wherein the first axis of rotation and the second axis of rotation are located above the third axis of rotation, the fourth axis of rotation, the fifth axis of rotation, the sixth axis of rotation, and the seventh axis of rotation.

19. A tracked vehicle as claimed in claim 1, wherein the first pivot axis is equidistant to the third axis of rotation and the fourth axis of rotation.

20. A tracked vehicle as claimed in claim 1, wherein the second pivot axis is equidistant to the fifth axis of rotation and the seventh axis of rotation.

21. A tracked vehicle as claimed in claim 1, wherein the second pivot axis is aligned with the sixth axis of rotation.

22. A tracked vehicle as claimed in claim 1, wherein, along the longitudinal direction of the tracked vehicle, a distance between the fifth axis of rotation and the sixth axis of rotation is identical to a distance between the sixth axis of rotation and the seventh axis of rotation.

23. A tracked vehicle as claimed in claim 1, wherein, along the longitudinal direction of the tracked vehicle, a spacing of the first one of the support wheels and the second one of the support wheels is identical to a spacing of adjacent ones of the third one of the support wheels, the fourth one of the support wheels, and the fifth one of the support wheels.

24. A tracked vehicle as claimed in claim 1, wherein the track assembly supports a portion of a weight of the tracked vehicle when the tracked vehicle is in use, the first bogie and the second bogie being configured such that, when the tracked vehicle is in use, the portion of the weight of the tracked vehicle supported by the track assembly is never applied to only one of the support wheels.

25. A tracked vehicle as claimed in claim 1, wherein the track assembly supports a portion of a weight of the tracked vehicle when the tracked vehicle is in use, the first bogie and the second bogie being configured such that each of the support wheels always bears some of the portion of the weight of the tracked vehicle supported by the track assembly when the tracked vehicle is in use.

26. A track assembly for traction of a tracked vehicle, the tracked vehicle comprising a prime mover and a chassis supporting the prime mover, the chassis comprising a frame extending along a longitudinal direction of the tracked vehicle, the track assembly being mountable on a side of the tracked vehicle and comprising:
   a) a first wheel rotatable about a first axis of rotation, the first axis of rotation being transverse to the longitudinal direction of the tracked vehicle;
   b) a second wheel rotatable about a second axis of rotation, the second wheel being spaced apart from the first wheel along the longitudinal direction of the tracked vehicle, the second axis of rotation being transverse to the longitudinal direction of the tracked vehicle;
   c) a plurality of support wheels arranged in an in-line configuration between the first wheel and the second wheel;
   d) a first bogie carrying a first one of the support wheels and a second one of the support wheels, the first bogie being pivotally mountable to the frame about a first pivot axis, the first one of the support wheels being rotatable about a third axis of rotation, the second one of the support wheels being rotatable about a fourth axis of rotation, each of the first pivot axis, the third axis of rotation, and the fourth axis of rotation being transverse to the longitudinal direction of the tracked vehicle;
   e) a second bogie carrying a third one of the support wheels, a fourth one of the support wheels, and a fifth one of the support wheels, the second bogie being spaced apart from the first bogie along the longitudinal direction of the tracked vehicle and being pivotally mountable to the frame about a second pivot axis, the third one of the support wheels being rotatable about a fifth axis of rotation, the fourth one of the support wheels being rotatable about a sixth axis of rotation, the fifth one of the support wheels being rotatable about a seventh axis of rotation, each of the second pivot axis, the fifth axis of rotation, the sixth axis of rotation, and the seventh axis of rotation being transverse to the longitudinal direction of the tracked vehicle; and f) an endless track disposed around the first wheel, the second wheel, and the support wheels, the endless track comprising:
  i. a top run extending between the first wheel and the second wheel; and
  ii. a bottom run for engaging the ground, the support wheels engaging the bottom run,
  the first wheel being a drive wheel to impart movement of the endless track.

27. A tracked vehicle comprising:
a) a prime mover;
b) a chassis supporting the prime mover, the chassis comprising a frame extending along a longitudinal direction of the tracked vehicle;
c) a plurality of track assemblies for traction of the tracked vehicle, a first one of the track assemblies being on a first side of the tracked vehicle, a second one of the track assemblies being on a second side of the tracked vehicle, each of the track assemblies supporting a portion of a weight of the tracked vehicle when the tracked vehicle is in use, each track assembly comprising:
  i) a first wheel rotatable about a first axis of rotation, the first axis of rotation being transverse to the longitudinal direction of the tracked vehicle;
  ii) a second wheel rotatable about a second axis of rotation, the second wheel being spaced apart from the first wheel along the longitudinal direction of the tracked vehicle, the second axis of rotation being transverse to the longitudinal direction of the tracked vehicle;
  iii) a plurality of support wheels arranged in an in-line configuration between the first wheel and the second wheel, a first one of the support wheels being rotatable about a third axis of rotation transverse to the longitudinal direction of the tracked vehicle, a second one of the support wheels being rotatable about a fourth axis of rotation transverse to the longitudinal direction of the tracked vehicle, a third one of the support wheels being rotatable about a fifth axis of rotation transverse to the longitudinal direction of the tracked vehicle, a fourth one of the support wheels being rotatable about a sixth axis of rotation transverse to the longitudinal direction of the tracked vehicle, a fifth one of the support wheels being rotatable about a seventh axis of rotation transverse to the longitudinal direction of the tracked vehicle, the support wheels being mounted such that, when the tracked vehicle is in use, the portion of the weight of the tracked vehicle supported by the track assembly is never applied to only one of the support wheels;
  iv) an endless track disposed around the first wheel, the second wheel, and the support wheels, the endless track comprising:
    i. a top run extending between the first wheel and the second wheel; and
    ii. a bottom run for engaging the ground, the support wheels engaging the bottom run,
    the first wheel being a drive wheel to impart movement of the endless track.

\* \* \* \* \*